United States Patent
Godwin

(10) Patent No.: US 7,895,615 B1
(45) Date of Patent: Feb. 22, 2011

(54) MEDIA DELIVERY ASSURANCE IN BROADCAST DISTRIBUTION SERVICES

(75) Inventor: John P. Godwin, Los Angeles, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 1512 days.

(21) Appl. No.: 10/434,352

(22) Filed: May 8, 2003

(51) Int. Cl.
H04N 7/16 (2006.01)
H04N 5/76 (2006.01)
H04N 9/88 (2006.01)

(52) U.S. Cl. .................. 725/28; 725/142; 386/239; 386/263; 386/291

(58) Field of Classification Search .............. 725/28, 725/86, 87, 91, 93, 98, 131, 139, 151; 386/35–47, 386/1, 21, 83, 113, 124; 455/504–505
See application file for complete search history.

(56) References Cited

U.S. PATENT DOCUMENTS

| | | | |
|---|---|---|---|
| 4,956,709 A | 9/1990 | Richer et al. | |
| 5,130,792 A | 7/1992 | Tindell et al. | |
| 5,534,941 A | 7/1996 | Sie et al. | |
| 5,585,858 A | 12/1996 | Harper et al. | |
| 5,589,892 A | 12/1996 | Knee et al. | |
| 5,654,747 A * | 8/1997 | Ottesen et al. ............. | 725/1 |
| 5,734,413 A | 3/1998 | Lappington et al. | |
| 5,793,413 A * | 8/1998 | Hylton et al. ............. | 725/81 |
| 5,887,243 A | 3/1999 | Harvey et al. | |
| 6,216,263 B1 * | 4/2001 | Elam ....................... | 725/28 |
| 6,252,586 B1 | 6/2001 | Freeman et al. | |
| 6,295,647 B1 | 9/2001 | Ramaswamy | |
| 6,353,638 B1 | 3/2002 | Hottinen et al. | |
| 6,370,317 B2 | 4/2002 | Nagano et al. | |
| 6,545,709 B2 * | 4/2003 | Takei et al. ............... | 348/222.1 |
| 6,608,994 B1 * | 8/2003 | Wegener et al. ........... | 455/3.06 |
| 6,691,311 B1 * | 2/2004 | Yata et al. ................ | 725/68 |
| 6,854,127 B1 * | 2/2005 | Kanemitsu ................ | 725/58 |
| 7,003,794 B2 * | 2/2006 | Arye ....................... | 725/100 |
| 2001/0052130 A1 | 12/2001 | Yap et al. | |
| 2002/0054750 A1 | 5/2002 | Ficco et al. | |
| 2002/0092021 A1 | 7/2002 | Yap et al. | |
| 2002/0100049 A1 | 7/2002 | Yamato et al. | |
| 2004/0019909 A1 * | 1/2004 | Takahashi ................ | 725/58 |
| 2004/0073945 A1 * | 4/2004 | Yuzawa ................... | 725/132 |

FOREIGN PATENT DOCUMENTS

WO    WO 0182601 A1 * 11/2001

OTHER PUBLICATIONS

John W. Byers, Michael Luby and Michael Mitzenmacher; Article: "Accessing Multiple Mirror Sites in Parallel: Using Tornado Codes to Speed Up Downloads", 1999 IEEE.

* cited by examiner

Primary Examiner—Andrew Y Koenig
Assistant Examiner—Jason Thomas

(57) ABSTRACT

A system and method for applying quality assurance methods in the determination of whether or not to present previously recorded digital content as available to a viewer at a customer site. The present invention checks the digital content and makes a quality assurance comparison in determining whether to add content to an electronic program guide for selection by a customer. The present invention presents acceptable recorded content as available, and withholds unacceptable content as a means of quality assurance.

27 Claims, 4 Drawing Sheets

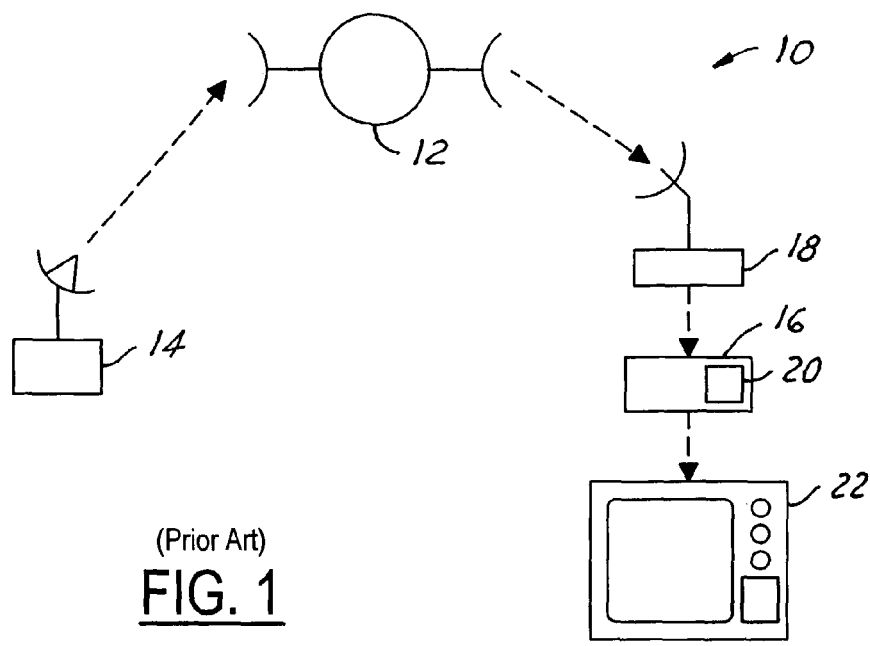
(Prior Art)
FIG. 1
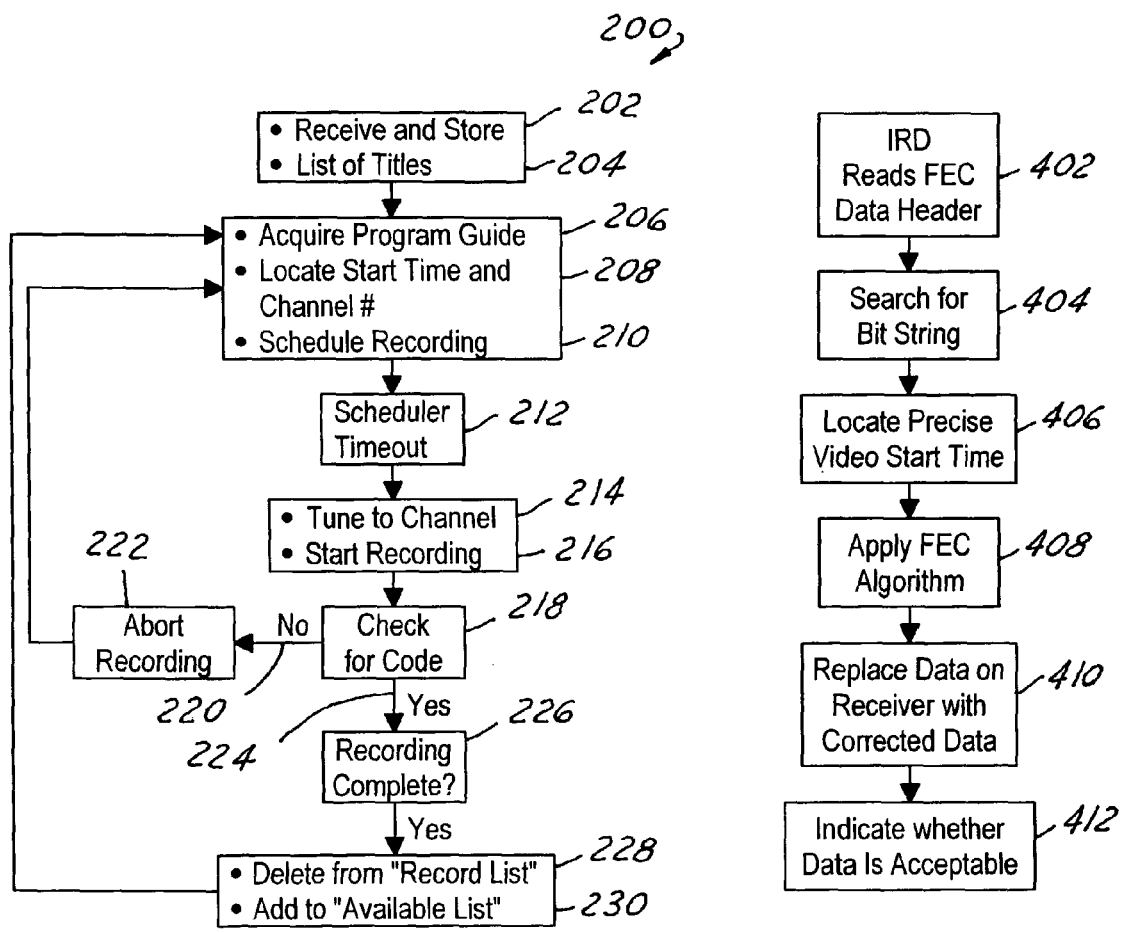
FIG. 4
FIG. 7

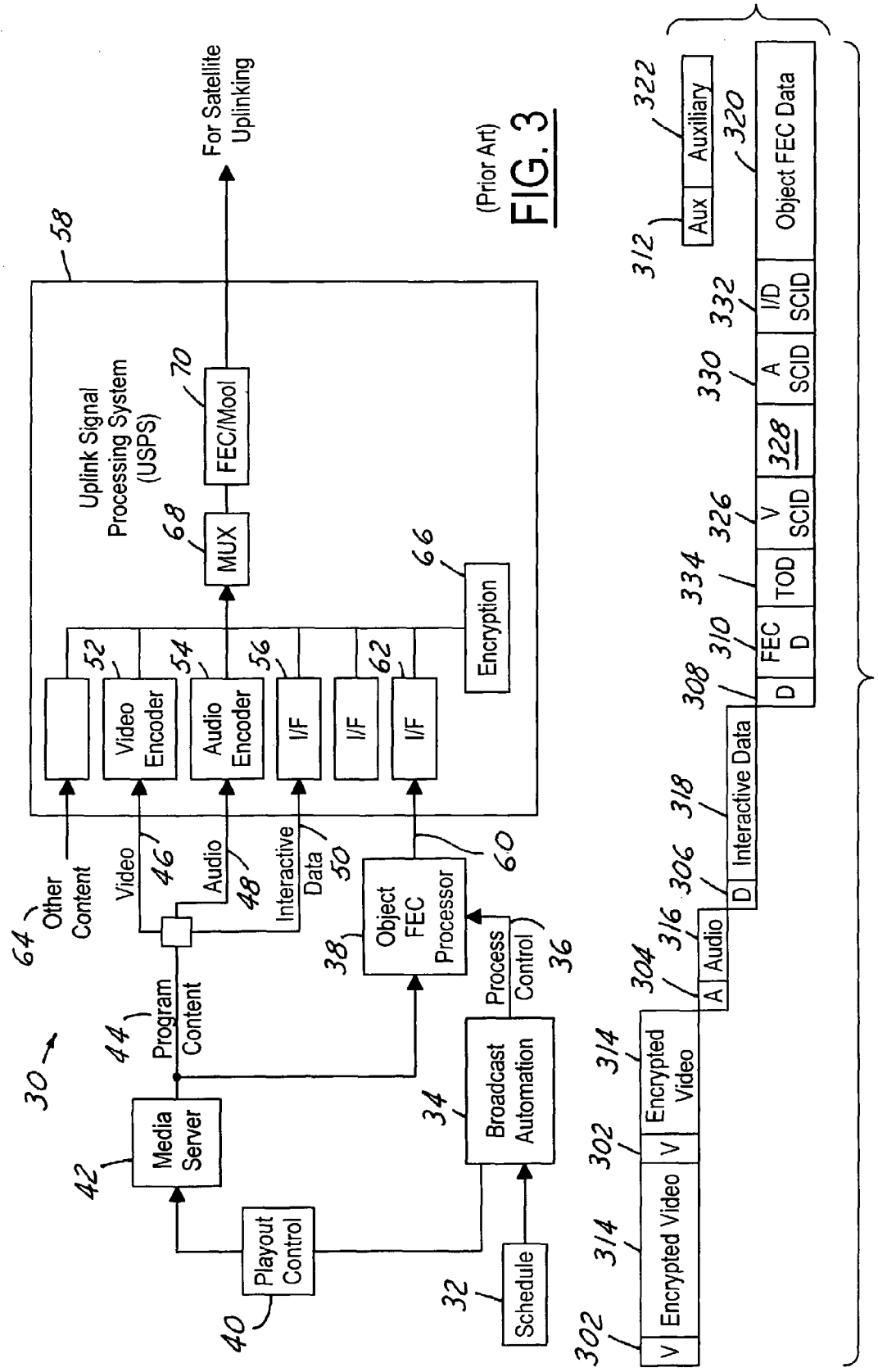

MEDIA DELIVERY ASSURANCE IN BROADCAST DISTRIBUTION SERVICES

TECHNICAL FIELD

The present invention relates generally to a system and method for delivering digital media to a set-top box and more particularly to confirming highly reliable digital media delivery to a set-top box.

BACKGROUND OF THE INVENTION

Broadcast or uni-directional distribution systems, such as digital direct broadcast satellite (DBS) or some digital cable systems, have demonstrated the capability for highly reliable delivery of digital media. Typically in these systems the various components of a program such as the video, audio, closed captioning, and electronic program guide (EPG) are transmitted in real time as logical streams of data packets that are decoded by a set-top box and then "presented" to a viewer on a television display. If there is a substantial impairment in the real-time delivery, such as that caused by a rain outage, the viewer is well aware of the cause and, to some extent, appreciates the reason for the impairment.

The deployment of digital video recorders (DVRs) in satellite and cable systems provides the opportunity for non-real-time content delivery. In non-real-time content delivery, the content can be stored on the DVR and played back at a later time. During playback the customer may take the viewpoint that since it is not raining during playback, the displayed content should have no impairments. Furthermore, systems such as DBS and cable have a need to compete with content playback from digital video devices, such as DVD's, that provide a near flawless playback experience.

Given the factors above, there is a need to provide delivery without significant impairment and the need to know at the receiver, with high certainty, that reliable delivery has occurred at the receiving end.

SUMMARY OF THE INVENTION

The present invention is a system and method for permitting a set-top box, or integrated receiver/decoder (IRD) to determine, with high certainty, whether a complete program has been successfully recorded on a DVR. If and only if the recording is successful, the IRD software will "offer" the content to the viewer by listing it in a menu or program guide.

In one embodiment, the present invention determines successful delivery of the content but makes no attempt to alter, or modify, the broadcast. In another embodiment, the present invention increases the likelihood of success by making corrections to the defective broadcast.

It is an object of the present invention to provide highly reliable delivery of digital media for playback of the digital media at a later time. It is another object of the present invention to determine if a delivery has been successful. It is still a further object of the present invention to offer the content to a viewer by way of a menu or guide upon the determination that the delivery was a success.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 1 is a block diagram of a typical DBS system;

FIG. 3 is a diagram outlining the broadcast center processing according to one embodiment of the present invention;

FIG. 4 is a flow chart of a receiver algorithm for delivery assurance including error correction according to another embodiment of the present invention;

FIG. 6 is an example of a data packet structure of a data stream; and

FIG. 7 is a flowchart of the quality assurance check method associated with the method shown in FIG. 4.

DETAILED DESCRIPTION OF PREFERRED EMBODIMENTS

Figure 2:
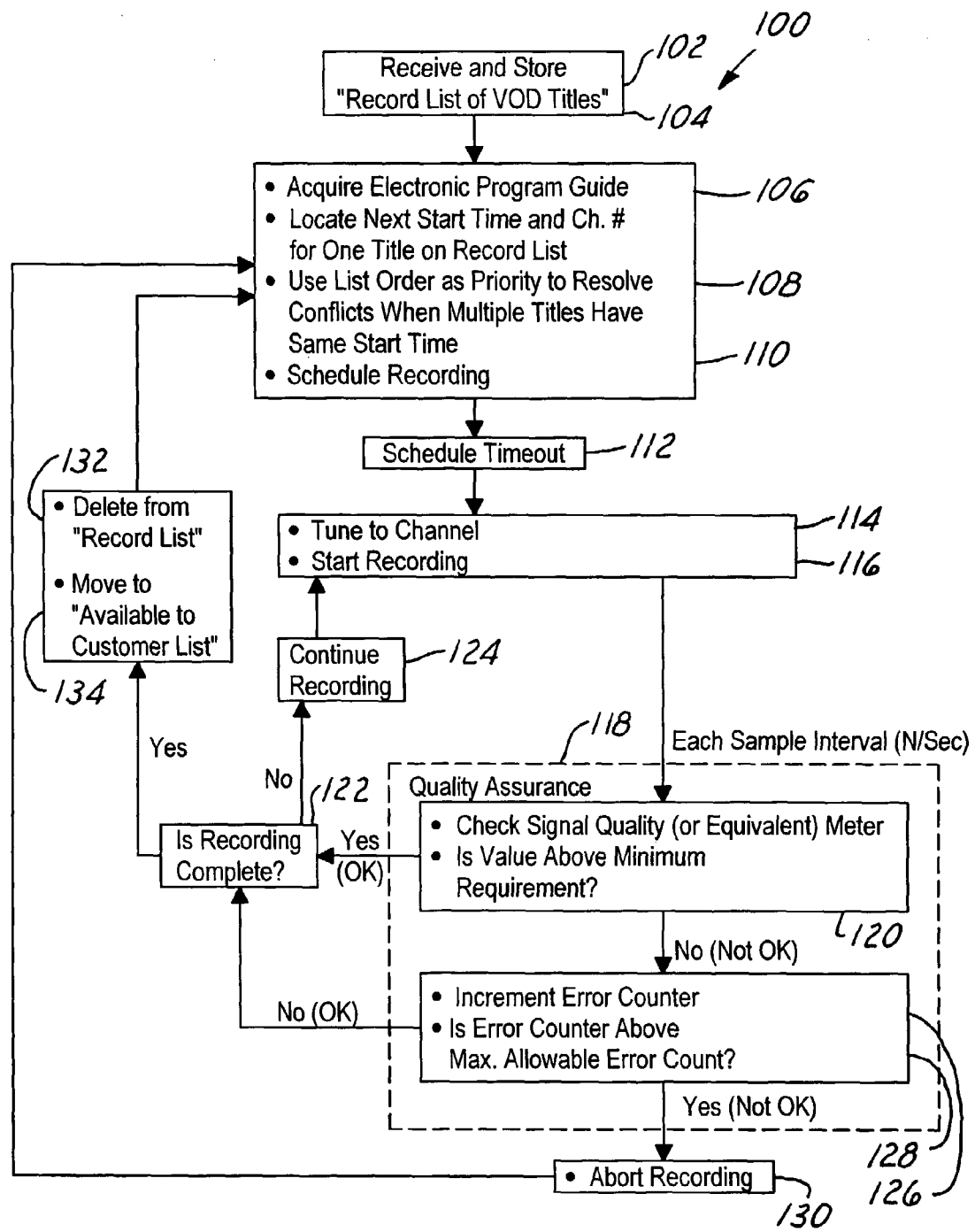
FIG. 2 is a flow chart of a receiver algorithm for delivery assurance according to one embodiment of the present invention.

The present invention is being described herein with reference to a particular digital broadcast satellite system as shown in FIG. 1. It should be noted however that the present invention is applicable to any DBS or digital cable system. FIG. 1 shows a typical DBS system 10 having at least one satellite 12 for receiving broadcast data from a broadcast site 14 and sending the data to a receiver/decoder such as a set top box of integrated receiver/decoder (IRD) 16. The signals are typically received by way of an antenna 18 at the customer site. The IRD 16 has a digital video recorder (DVR) 20 that stores the digital media to be played back on a television monitor 22 at a later, time.

In a system such as the one described in FIG. 1 the content is processed by analog to digital conversion of the video and audio components, compression of each component separately as appropriate for the specific component, and encryption of the content to control access. The processed signal components are multiplexed along with the digital content from other programs or channels. The multiplexing may also include overhead information such as packets for synchronization, conditional access and an electronic program guide. Forward error correction (FEC) is used on the stream from the multiplexer and modulated onto a data interface (I/F). The I/F signal is upconverted to a microwave band, amplified and transmitted to the satellite for distribution.

The customer typically uses a remote control to tune to the channel of choice. The receiver, using a look-up table, tunes to the satellite transponder that carries the desired viewer channel. Typically, although the transponder's information stream carries multiple programming channels, only a single television channel, with both video and audio, is decoded for display.

The DVR 20 is integral to the IRD 16. Under customer control, the DVR 20 can record programs digitally for future playback. Some DVRs can be scheduled to record future programming.

According to the present invention, with software downloads to the IRDs, the DVRs can record programs directed by the network operator from the broadcast site. Once recorded, the programs are listed for the customer, such as "Tonight's Video On Demand". According to the present invention, it is desired that the recorded content not be listed as available until completely and accurately recorded. Furthermore, according to the present invention, this is accomplished through efficient use of the satellite capacity.

Referring to FIG. 2, a basic embodiment 100 is described. The receiver receives 102, from the broadcast site, a list of several titles, such as movie, program or event titles that are available over night or during some similar period. The receiver stores 104 this list. In a typical model, each movie title appears on multiple channels with a new showing every thirty minutes. The receiver acquires 106 the electronic program guide and locates 108 the next start time and channel for one title on the list. The list is also used to resolve conflicts when multiple titles have the same start time. The receiver then schedules 110 the recording. The scheduler process has a "timeout" 112 to start the actual recording.

The receiver then tunes 114 to the desired channel and commences recording 116. Typically the network operator commands the DVRs in the network to make one recording of each movie title on the list of movies during low viewing times, such as early morning hours, or when a customer is typically not controlling the DVR.

One or more of the recordings may have outages due to rain fades or other issues. In the example provided herein, the broadcast system 10 is a uni-directional system meaning the IRD 16 does not provide positive or negative acknowledgements to the broadcast site. With uni-directional systems, it is typical to ensure delivery simply by re-broadcasting the content on a repeated basis. However, this is an inefficient use of system resources.

The present invention samples 118 the signal at a predetermined interval, such as once per second, as means for quality assurance. The sampled signal is compared 120 to a minimum threshold. If the sample is above the threshold the DVR checks to see if the recording is complete 122. If the recording is still incomplete, the DVR continues recording 124 until the recording is complete. If the sample is below the threshold it is counted 126 by an incremental counter and compared 128 to a maximum allowable limit for the error count. Once the maximum allowable error count is exceeded, the recording is aborted 130. The DVR then returns to the list for the next title on the list.

Should the maximum errors be less than or equal to the allowable limit, the DVR checks to see if recording is complete 122. Recording continues 124 in this manner until successful recording is complete. Upon successful completion of recording, the movie title is removed 132 from the record list and added to 134 an "available to customer" list.

In practice it is possible that a single rain fade can render a given recording useless. Therefore, as soon as a fade event is detected, it is possible for the recorder to abandon that attempt and then to record and tune to the channel with the next starting time from the record list.

FIG. 2 describes the sampling as being applied to a signal quality meter. Signal quality metrics are used in the application of the reception assurance algorithm that determines whether or not to present the content for viewing. Signal quality metrics may include signal-to-noise (S/N) ratio, carrier-to-noise (C/N) ratio, or signal power level to name but a few. It is possible, however, for the receiver to sample other available information to determine that reception remains acceptable. An alternative to signal quality sampling is the monitoring of data from FEC decoding circuits and acceptance of conditional access data packets by the conditional access manager.

In addition, the description of this embodiment describes recording one movie title at a time. It is possible, and may be practical, to record more than one title at the same time using a single IRD/DVR. The network operator can schedule multiple titles on a single transponder. In this embodiment, sampling of the signal strength meter will apply to all simultaneous recordings on that transponder.

This basic embodiment is effective, but has some drawbacks associated with it. For example, random errors may occur even under clear weather conditions and the content will have impairments, as no attempt is made to detect and correct errors. Also, as the program length increases, the likelihood increases for impairments and the method requires many recording attempts.

In another embodiment of the present invention, these drawbacks are addressed. FIG. 3 is a block diagram of a typical broadcast center processing arrangement 30 that is necessary to treat all data packets that constitute the video, audio and data of a title, which is a program, movie or event, as a single data object. The data object is protected by a single Forward Error Correction code providing both error detection and error correction. Specialized codes have been developed for this purpose, particularly for a burst error environment such as is experienced during rain fades. "Accessing Multiple Mirror Sites in Parallel: Using Tornado Codes to Speed Up Downloads" by J. W. Byers, M. Luby and M. Mitzenmacher, Proceedings of IEEE INFOCOM '99, pages 275-283, March 1999, describes the use of specialized codes, called tornado codes, for satellite distribution applications. This article is incorporated herein by reference.

Referring to FIG. 3, a schedule 32 is provided to a broadcast automation system 34. The broadcast automation system 34 executes the schedule 32 and forwards process control information 36 to an object FEC processor 38. The schedule 32 is also used by the broadcast automation system 34 to send a playout control 40 to a media server 42. The media server 42 outputs program content 44 in individual components, such as video 46, audio 48, and interactive data 50. The components are sent to respective encoders 52, 54 and data interface 56 in an uplink signal processing system (USPS) 58. The program content 44 is also provided to the object FEC processor 38.

Output 60 of the FEC processor 38 is also provided as an input to a data interface 62 in the USPS 58. The object FEC processor utilizes tornado codes, or codes with similar characteristics, because with only a modest increase in the total object size one or more significant outages can occur yet the complete object will still be fully reconstructed. Furthermore, the encoding and decoding times for tornado codes are modest compared to other coding methods such as Reed-Solomon codes. Once the FEC data object is created it can be re-broadcast intact and does not need to be recomputed. Therefore, the output 60 of the object FEC processor 38 is also stored on the media server 42 for later re-broadcast.

The different data streams 46, 48, 50, 60 are processed along with any other content 64 that may be necessary or desired. The inputs are processed as indicated in FIG. 3 and encrypted 66 before being sent to a multiplexer 68. A modulator 70 prepares the signal for uplink to a satellite system (not shown in FIG. 3).

The object FEC processor 38 shown in FIG. 3 is known in the art and is used in conjunction with the method 200 of the present invention shown in FIG. 4. The method 200 uses the tornado codes described above, or an alternate Forward Error Control or authentication code, to ensure that all necessary components are delivered and available intact. Similar to the algorithm described in conjunction with FIG. 2, the customer will not be offered the content, as by way of the onscreen list, until the code indicates accuracy and completeness of all components of the content associated with a particular title.

Referring to FIG. 4, the IRD receives 202 and stores 204 the list of titles to record. The IRD acquires 206 the electronic program guide and uses the list order as priority to resolve conflicts when multiple titles have the same start time. The IRD locates 208 the start time and channel list for a particular title from the list, and schedules 210 the recording. The scheduler process 212 has a "timeout" to initiate the actual recording.

The IRD tunes 214 to the desired channel and starts recording 216. The quality assurance is a check 218 for the FEC and/or authentication code provided by the object FEC processor. This code verifies that the content has been completely and accurately broadcast. When the code cannot confirm correct reception 220, the recording is aborted 222. When the code confirms reception 224, the receiver knows that recording is complete 226. Upon completion of recording, the title is deleted 228 from the record list and added to the available customer list 230 where it can be added to the program guide for selection by the customer.

The nesting of the object FEC codes related to each individual content component within the entire transmission multiplex provides an indication of an accurate and complete transmission and therefore allows the content to be presented to the customer with confidence. It is possible that the nested object FEC codes be taken even further for quality assurance measures. For example, a title may include a film, a biography about the director and a video describing the making of the film. An FEC code is used to improve the delivery of each of the components of the film, as described above including the video and audio components, and another FEC code is used for the biography, while still another FEC code is used for the "Making Of . . . " video. Finally, an authentication code is used over all of the objects to verify delivery of all the necessary content.

In some cases, the titles are provided to a customer in two different formats. For instance in the case of DIRECTV systems and other multi-channel digital-media delivery systems, a given movie is provided to a customer in a DVR video-on-demand (VOD) format as well as a pay-per-view (PPV) format to customers without a DVR. In this case, the data object must be broadcast twice, which increases the bandwidth used during the broadcast as the content is broadcast once as a DVR data object and again as a pay-per-view object. This situation is addressed by the embodiment 80 of the present invention shown in FIG. 5.

Figure 5:
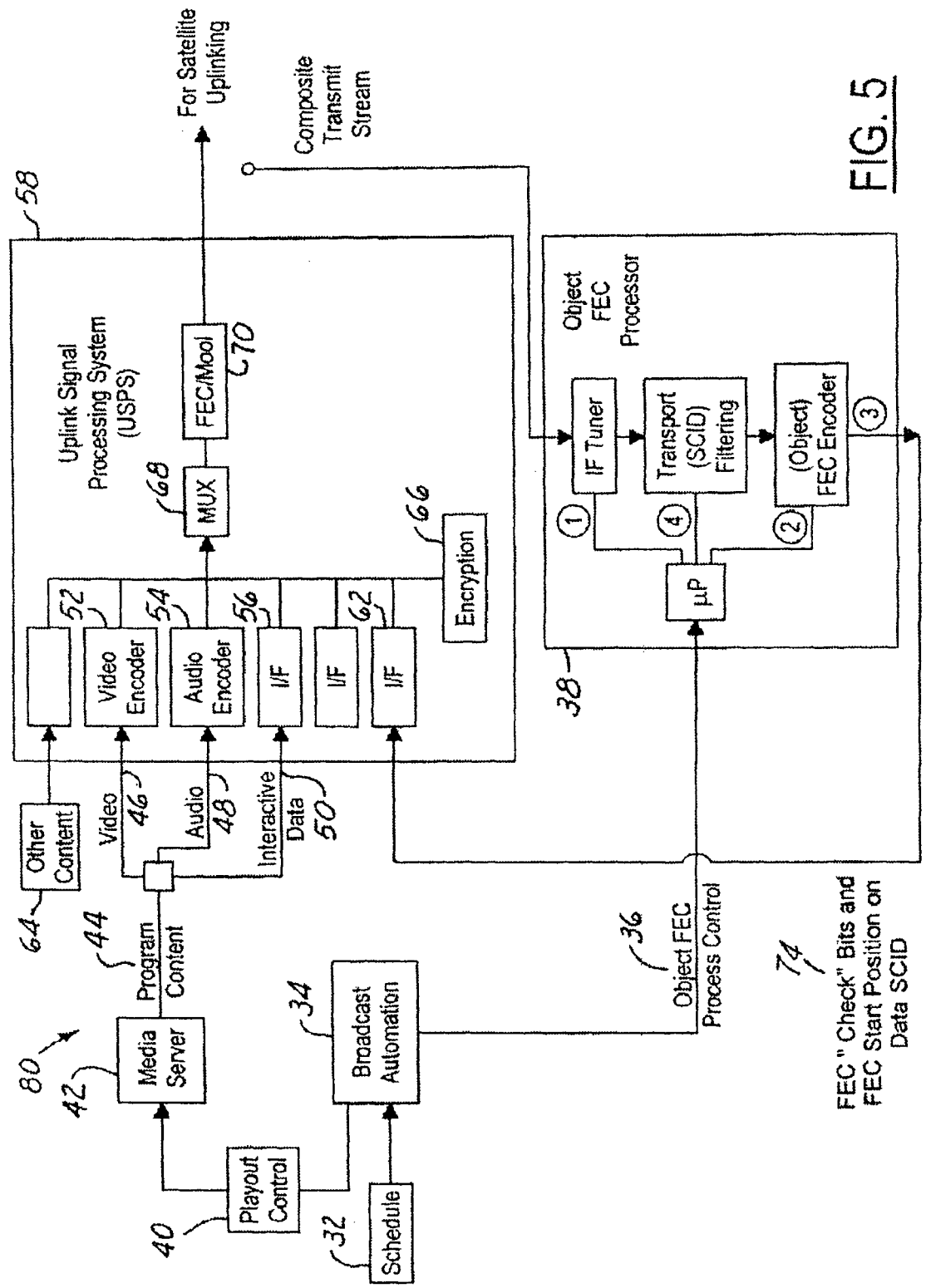
FIG. 5 is a diagram outlining the broadcast center processing according to another embodiment of the present invention.

Like reference numbers in FIGS. 3 and 5 depict like elements as described with reference to FIG. 3. Referring now to FIG. 5 the content need only be broadcast once, and the data object FEC "check" bits are recomputed during each data object broadcast.

The present invention can utilize error detection and correction codes that have an information part and add check bits thereto. Further, a Service Channel Identifier (SCID) is associated with an underlying Permanent Virtual Circuit (PVC) between a broadcast site and a customer receiver. The SCID is a numerical label in the header of the data packets of a given service channel, or PVC. The Object FEC processor 38 creates a data object that includes the content sent as video packets sent on a video SCID plus the content sent as audio packets on the audio SCID, plus check bits generated by the FEC algorithm 70 and carried on a data SCID 74. The data SCID 74 also contains "FEC start pointer" information that permits the receiver to determine the video and audio starting points used by the FEC algorithm at the originating end.

In the example shown in FIG. 5, FEC is used in conjunction with the modulation 70 on every digital link to detect and correct transmission errors. The existing coding scheme is a combination of convolutional coding and block coding. For the present invention, additional coding is applied only over a portion of the broadcast stream to create the data object FEC used in the present invention.

A data packet is constructed during the detection and check processes described with reference to FIGS. 3 and 5. This data packet contains the information used by the quality assurance method of the present invention shown in FIG. 4, specifically at reference number 218.

In a delivery system where content starts and stops at specific "byte boundaries", it is very straightforward to perform the object FEC encoding start synchronization method between the data SCID and the video and audio SCIDs. For example, the object FEC start pointer on the data SCID would list the corresponding video and audio SCIDs and the byte counts to the object FEC start point with respect to the previous major epoch of network time.

On the other hand, there are networks with imprecise start and stop time boundaries. For example, the start of a pay-per-view movie may vary by 1 or 2 seconds with respect to the corresponding boundaries in the electronic program guide or conditional access systems. Given this lack of precision, another means of identifying the precise program start point and the object FEC start point is needed.

According to the present invention, a precise FEC start pointer can be provided in spite of imprecise content time boundaries. Most digitally broadcast video data is encrypted and is therefore effectively a random bit stream. At the originating end, when the data object construction is initiated, the starting point for the video content is recorded as the Time-of-Day clock plus a bit string, typically 20 bits or greater, copied from the encrypted video stream itself. To facilitate the decode process, the bit string is "grabbed" immediately after the video packet header. The time-of-day and the bit string are stored as the "video start pointer" within the information on the data SCID. Also on the originating end, the object FEC algorithm is applied to the corresponding audio SCID starting with the first audio packet on that SCID after the video packet used to create the video start pointer.

FIG. 6 illustrates the packet structure of a data stream created by the object FEC encoding equipment. Each component of the data has a SCID. In the example shown in FIG. 6, SCID 10 is for the video portion, SCID 11 is for the audio portion, SCID 12 is for the interactive data portion, and SCID 15 is for the object FEC data.

The packet structure includes a packet header for each component. The video has a video packet header 302, the audio portion has a packet header 304, and the interactive data portion has a data packet header 306. The object FEC data has a data packet header 308 and a separate object FEC data header 310. An auxiliary data packet has an auxiliary data header 312. Each header introduces the respective data associated with the header. For example, the video packet header 302 introduces the video data 314 that follows. This data is typically encrypted. The audio packet header 304 precedes the audio portion 316, the interactive data header 306 precedes the interactive data portion 318 and the auxiliary packet header 312 precedes auxiliary data 322.

The object FEC data header 310 contains information used by the method of the present invention to determine whether or not to present programming data to a customer. The object FEC header includes the time of day (TOD) 334, the video SCID 326, a video start pointer 328, the audio SCID 330, the interactive data SCID 332, and the object FEC data 320.

Referring now to FIG. 7, a method 400 explains how the data stream structure is utilized during the quality assurance check portion of the present invention when the object FEC data is decoded. The data SCID includes all object FEC check bits, the video start pointer, and an inventory of all other SCIDS, such as audio, that are "checked" by the FEC. At the receiver end, the reconstruction process is as follows. The data components of a program are recorded given an over-the-satellite command to record the content of a specific program. The over-the-satellite command will also cause recording of the object FEC data. Decoding of this object FEC data can occur during the recording session or after recording of the content is complete.

When object FEC decoding is initiated 402, the receiver reads the object FEC data header and begins a search 404 through the video packets for a string occurring just after a video packet header. The receiver is searching for a bit string that exactly matches the bit string stored in the video start pointer 328. With twenty random bits, the probability of a false lock is about one in one million. By using a string of thirty bits, the probability of a false lock is improved to one in one billion.

After the precise video start point is located 406, the object FEC algorithm is applied 408 to the video packets and the associated audio and interactive data packets beginning with the packets of these types that occur immediately following the "start" video packet. The object FEC can both detect and correct certain errors across all packet types. The corrected data replaces 410 the received data on the IRDs hard drive. If the object FEC indicates 412 an acceptable level of received data quality, then the content is placed in the customer list as "available". If the data quality is unacceptable, the content will not be made available to the customer, and the receiver will wait for the next transmission, if any.

The present invention is a method for applying quality assurance methods to determine whether or not to present previously recorded content as available to a customer. The quality metric may vary with the complexity of the quality assurance method, but the basic principle remains the same. If the recorded content is declared "acceptable", it is presented to the customer for viewing. If the recorded content is declared "unacceptable" it is withheld from the customer for viewing.

The invention covers all alternatives, modifications, and equivalents, as may be included within the spirit and scope of the appended claims.

What is claimed is:

1. A method for delivering digital content to a customer site, said method comprising the steps of:
   (a) broadcasting digital content over a plurality of channels at a plurality of start times to a receiver situated at a customer site;
   (b) selectively recording said digital content from a first channel in the plurality of channels having a first start time onto a storage medium associated with said receiver;
   (c) periodically performing a check on said digital content as selectively recorded during recording of said digital content for both quality and completeness, wherein the quality of the digital content is determined by periodically sampling the digital content and counting a number of errors present in the sample of the digital content;
   (d) determining whether the results of each said check meet predetermined minimum standard requirements for both quality and completeness, wherein the predetermined minimum standard for quality comprises a limit on the number of errors in the digital content;
   (e) if and when the predetermined minimum standard requirement for quality is determined to not be met, aborting said recording of said digital content from the first channel in the plurality of channels, preventing said digital content recorded from the first channel in the plurality of channels from being made available to a customer for viewing at said customer site, and re-recording said digital content from a second channel in the plurality of channels having a second start time later than the first start time;
   (f) if said predetermined minimum standard requirement for quality is determined to be met and the predetermined minimum standard requirement for completeness is determined to not be met, continuing said recording of said digital content; and
   (g) if said predetermined minimum standard requirements for both quality and completeness are determined to be met, making the selectively recorded digital content available to said customer for viewing at said customer site.

2. The method as claimed in claim 1, wherein step (c) is at least partially accomplished by applying a reception assurance algorithm to said digital content received by said receiver.

3. The method as claimed in claim 2, said method further comprising the step of downloading said reception assurance algorithm onto said storage medium associated with said receiver.

4. The method as claimed in claim 2, wherein said reception assurance algorithm includes applications of signal quality metrics.

5. The method as claimed in claim 4, wherein said signal quality metrics include at least one metric selected from the group consisting of a carrier-to-noise (C/N) ratio, a signal-to-noise (S/N) ratio, and a signal power level.

6. The method as claimed in claim 1, wherein step (b) is at least partially accomplished by simultaneously recording multiple selections from said digital content.

7. The method as claimed in claim 1, wherein step (a) is at least partially accomplished by broadcasting said digital content as a data object having protective coding.

8. The method as claimed in claim 7, wherein said protective coding includes forward error correction (FEC) codes.

9. The method as claimed in claim 8, said method further comprising the step of nesting said forward error correction (FEC) codes for each component of a complex content set.

10. The method as claimed in claim 7, wherein said protective coding includes authentication codes.

11. The method as claimed in claim 10, said method further comprising the step of nesting said authentication codes for each component of a complex content set.

12. The method as claimed in claim 1, wherein step (a) is at least partially accomplished by:
   splitting said digital content into a plurality of data streams; and
   applying protective codes over all components of said digital content so as to ensure delivery of all said components prior to display of any one of said components.

13. The method as claimed in claim 12, wherein the step of splitting said digital content is at least partially accomplished by:
   sending an object FEC data stream separate from video, audio, and interactive data streams; and
   sending check bits in said object FEC data stream.

14. The method as claimed in claim 13, wherein the step of sending check bits is at least partially accomplished by sending check bits that can be ignored by one or more receivers that lack the capability of recognizing said check bits.

15. The method as claimed in claim 13, wherein the step of sending check bits is at least partially accomplished by scheduling the sending of said check bits as needed and separate from any scheduling of other content for delivery.

16. The method as claimed in claim 12, said method further comprising the step of time aligning each of said data streams using a data byte count system.

17. The method as claimed in claim 12, said method further comprising the step of time aligning each of said data streams using a time-of-day (TOD) header to determine a true broadcast time and using bit level synchronization of unique bit patterns within encrypted content.

18. The method as claimed in claim 17, said method further comprising the step of using a bit pattern that immediately follows a predetermined content packet header.

19. The method as claimed in claim 17, said method further comprising the step of augmenting an existing outgoing content bit stream by way of a separate data interface for an ancillary FEC object stream.

20. A system for receiving digital content that is broadcast for delivery to a customer site, said system comprising:
   a receiver for receiving a broadcast of digital content over a plurality of channels at a plurality of start times at a customer site; and
   a storage medium operable to selectively record said digital content from a first channel in the plurality of channels having a first start time as received by said receiver;
   wherein said receiver is operable to:
   (a) periodically perform a check on said digital content as selectively recorded for both quality and completeness during recording of said digital content, wherein the quality of the digital content is determined by periodically sampling the digital content and counting a number of errors present in the sample of the digital content;
   (b) determine whether the results of each said check meet predetermined minimum standard requirements for both quality and completeness, wherein the predetermined minimum standard for quality comprises a limit on the number of errors in the digital content;
   (c) if and when the predetermined minimum standard requirement for quality is determined to not be met, abort the recording of said digital content from the first channel in the plurality of channels, prevent said digital content recorded from the first channel in the plurality of channels from being made available to a customer for viewing at said customer site, and re-recording said digital content from a second channel in the plurality of channels having a second start time later than the first start time; and
   (d) if said predetermined minimum standard requirements for both quality and completeness are determined to be met, make the selectively recorded digital content available to said customer for viewing at said customer site.

21. The system as claimed in claim 20, wherein each said check includes:
   a quality assurance comparison to minimum requirement for acceptable quality of broadcast content; and
   an electronic program guide for displaying the availability of recorded digital content that has acceptable quality.

22. The system as claimed in claim 21, wherein said quality assurance comparison is made against at least one metric chosen from the list consisting of signal quality, a signal-to-noise (S/N) ratio, a carrier-to-noise (C/N) ratio, and a signal power level.

23. The system as claimed in claim 21, said system further comprising means for error detection and correction, wherein said quality assurance comparison includes a check for protective codes indicating an acceptable quality for recorded content.

24. The system as claimed in claim 23, said system further comprising means for broadcasting digital content in separate data streams including video data, audio data, interactive data, and error correction data.

25. The system as claimed in claim 24, wherein said error correction data includes check bits that are separate from other error correction data.

26. The system as claimed in claim 24, said system further comprising time alignment of said separate data streams by byte count alignment.

27. The system as claimed in claim 24, said system further comprising time alignment of said separate data streams by applying time-of-day (TOD) and bit level synchronization of unique patterns in encrypted data.

* * * * *